No. 722,036. PATENTED MAR. 3, 1903.
W. B. NORTON.
TROLLEY STAND.
APPLICATION FILED MAY 26, 1902.
NO MODEL. 2 SHEETS—SHEET 1.
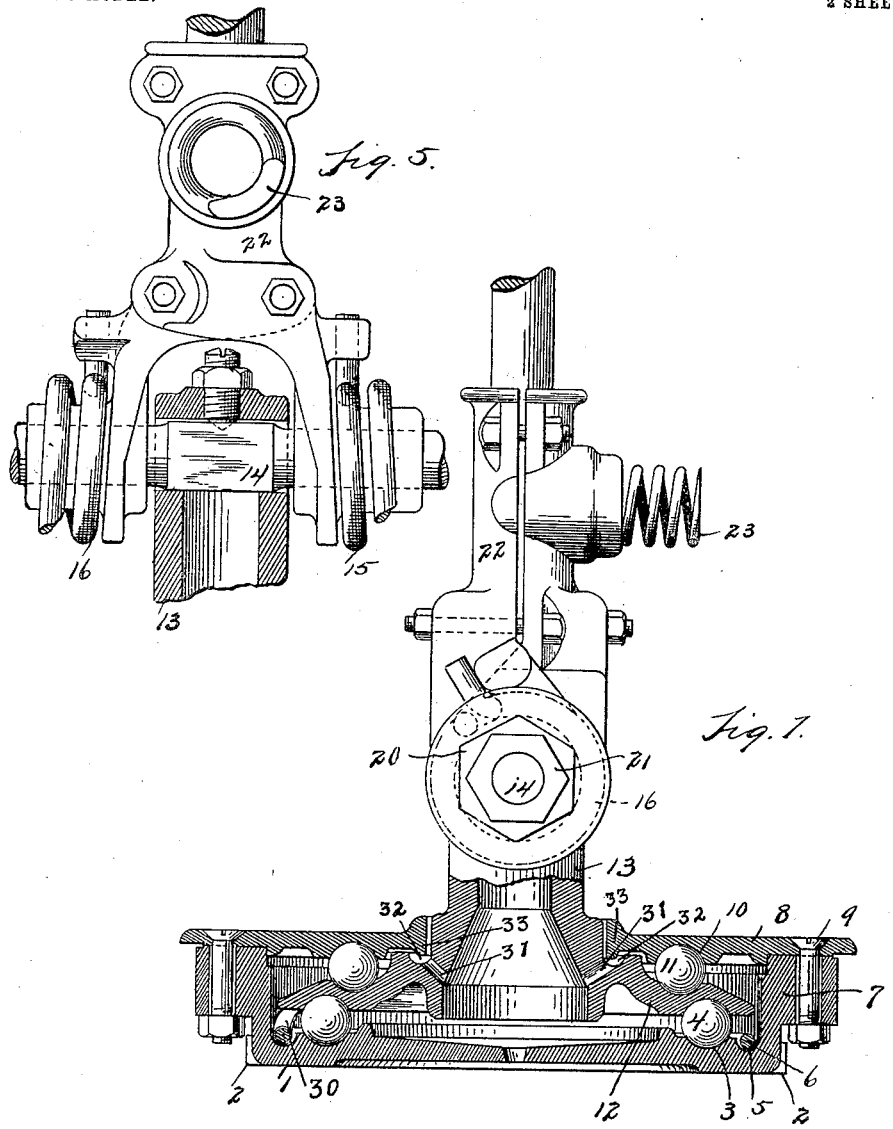
WITNESSES
Chas. E. Wiener
Wm. J. Degel
INVENTOR
William B. Norton
By Parker & Burton
Attorneys.

No. 722,036. PATENTED MAR. 3, 1903.
W. B. NORTON.
TROLLEY STAND.
APPLICATION FILED MAY 26, 1902.
NO MODEL. 2 SHEETS—SHEET 2.
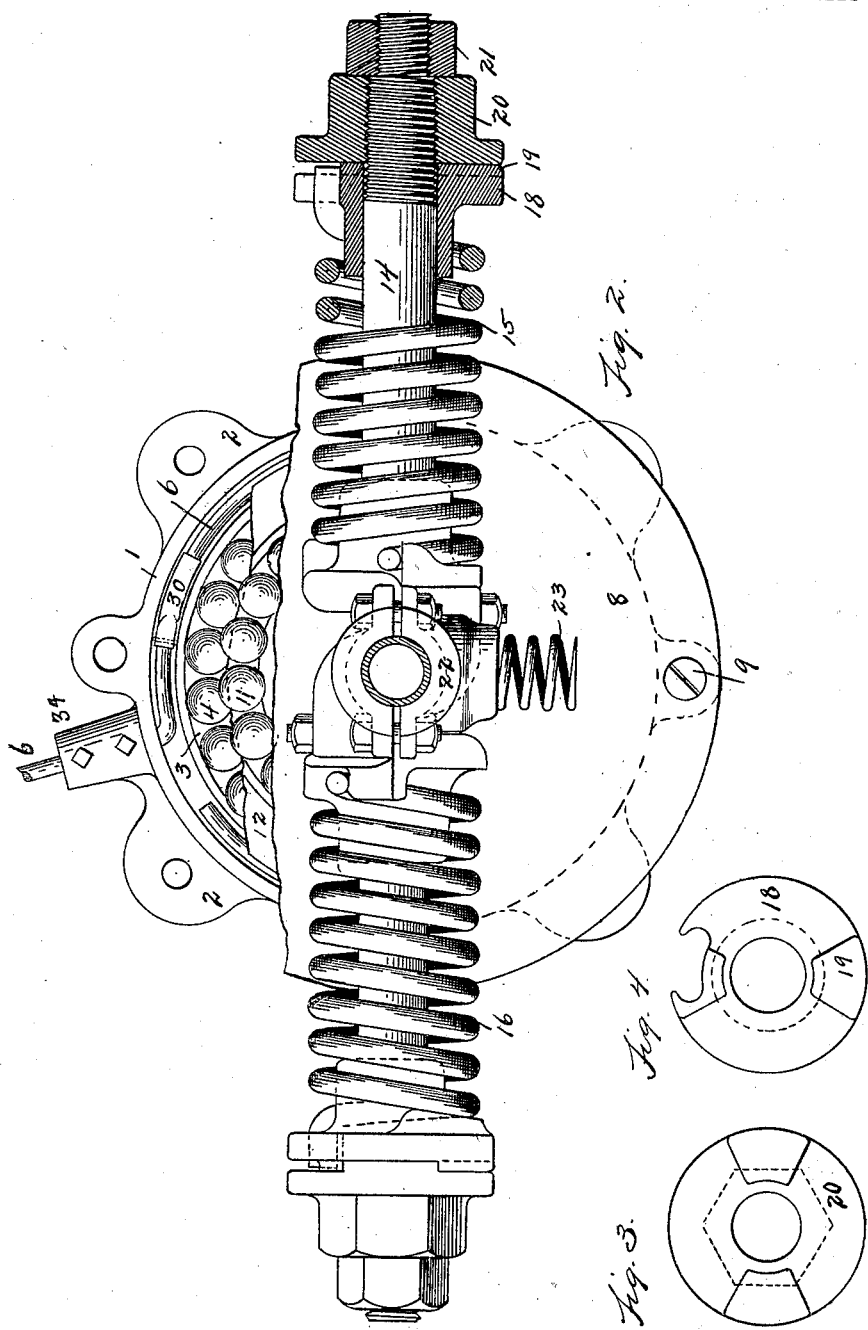
WITNESSES
INVENTOR
William B. Norton
By Parker & Burton
Attorneys.

UNITED STATES PATENT OFFICE.

WILLIAM B. NORTON, OF DETROIT, MICHIGAN, ASSIGNOR TO DETROIT TROLLEY & MANUFACTURING COMPANY, LIMITED, OF DETROIT, MICHIGAN.

TROLLEY-STAND.

SPECIFICATION forming part of Letters Patent No. 722,036, dated March 3, 1903

Application filed May 26, 1902. Serial No. 108,903. (No model.)

*To all whom it may concern:*

Be it known that I, WILLIAM B. NORTON, a citizen of the United States, residing at Detroit, county of Wayne, State of Michigan, have invented a certain new and useful Improvement in Trolley-Stands; and I declare the following to be a full, clear, and exact description of the invention, such as will enable others skilled in the art to which it pertains to make and use the same, reference being had to the accompanying drawings, which form a part of this specification.

This invention relates to trolley-stands, and has for its object an improved ball-bearing support for the trolley-pole socket. It also has for its object an improved device for regulating and holding the tension of the springs which hold the trolley against the wire.

In the drawings, Figure 1 is a side elevation of the socket with the support shown in cross-section. Fig. 2 is a plan view with part of the base broken away. Figs. 3 and 4 are details of the spring-holders. Fig. 5 is a rear elevation of the pole-socket and the top of stud. The stud is sectioned.

1 indicates a bearing arranged to be secured to the top of a car by means of bolts which pass through ends 2. The bearing is provided with an annular groove 3, arranged to receive a ring of bearing-balls 4. Outside of the annular groove 3 and spaced from it by an annular rib which bounds the bearing-groove is a second annular groove 5, arranged to receive a coil of line-wire 6, which is stripped from insulation and lies in contact with the center of the base 1 and is provided with spring contact-plates, which will be spoken of more at length hereinafter.

Outside the groove 5 the bearing-plate 1 is provided with an upturned flange 7, on whose upper edge rests the curved plate 8, secured to the flange 7 by bolts or screws 9. The plate 8 is provided with an annular groove 10, in which engages a second ring of balls 11 between the ring of balls 4, and the ring of balls 11 engage the foot-plate 12 of the socket-stud 13. The foot-plate is provided on its under side with a groove arranged to engage with the balls 4 and on its upper side with a groove arranged to engage with the balls 11, and the balls serve to hold the foot-plate supported from the body of the base 1, and the balls 11 prevent the foot-plate from rising to contact the plate 8 at any point.

The grooves in the plates are so formed that the balls will hold the foot-plate 12 accurately centered with reference to the bearing-plate 1.

The vertical stem rising from the foot-plate 12 rises through a center opening in the plate 8, and it supports a cross-rod 14, that carries springs 15 and 16. The spring at one side of the trolley-socket is a right-hand spring and the spring at the other side is a left-hand spring. The inner end of each spring engages with projecting lugs on the yoke. The outer end of each spring is secured to the rod 14 by securing the bent end of it to a washer 18, that is provided with lugs 19, and the lugs engage with cavities in a nut 20, that runs on a thread on the end of the cross-bar 14. Outside the nut 20 is a second nut 21 run onto a threaded portion of the cross-bar 14, that is of diminished diameter and is provided with a different thread from that by which the nut 20 engages with the cross-bar 14, one of the threads being a right-hand thread and the other a left-hand thread. The washer 18, engaging with the nut 20, is turned by turning the nut 20 until tension of sufficient degree has been placed on the spring. The outer nut 21 is then run up as a jam-nut and holds it in place with the spring at the desired amount of tension.

The shaft 14, where it passes through the stud 13, is squared to prevent turning and is held from longitudinal movement by a set-screw. It will be observed that the springs 15 will act to turn the socket and the pole therein up to and beyond the perpendicular until it is stopped by contact with some stationary object. Thus should the trolley-rope break the pole will be turned to a position at which it will pass under the stays or horizontal guide-lines of the feed-wire. To the socket part 22 of the pole is attached a buffer-spring 23, that is in position to contact the stop, which prevents further movement of the pole under the influence of the springs 15.

34 is a nipple upon the flange 7, the aperture through said nipple extending from the outside through the flange 7 and communicating with the groove 5. The line-wire 6 passes through the bore of the nipple 34, in which it is clamped by bolts, as indicated in Fig. 2, and then passes around in the groove 5 in contact with the bearing-plate 1.

30 is a brush secured to the line-wire 6 at that part which is in the groove 5 and contacting the under surface of the foot-plate 12 at the periphery of said plate, which surface is turned smooth to form a bearing for the brush. A number of brushes 30 are secured to the line-wire 6 in the groove 5. The object of the brushes 30 is to form a good electrical contact between the foot-plate 12 and the bearing-plate 1, so that the bearing-balls in the grooves in said plates shall not be injured by the arcing or sparking of the current.

32 is a circular groove formed in the upper surface of the foot-plate 12 at that part of said plate which comes beneath the edge of the aperture in the plate 8.

33 is an annular projection extending from the plate 8 at the periphery of the aperture in the center of said plate downward into the groove 32.

31 represents apertures extending through the plate 12 and opening into the groove 32. The upper surface of the bearing-plate 1 is dished and provided with an aperture at its center.

It will be seen that any water passing between the socket-stud 13 and the plate 8 will fall into the groove 32 and run downward through the apertures 31 and thence upon the plate 1 and through the central aperture therein.

What I claim is—

1. In a trolley-stand, the combination of a fixed base with a ball-bearing groove, a revoluble base, with upper and under ball-bearing grooves, a bearing cover-plate secured to the fixed plate, and a pole-socket pivotally secured to the revoluble base, substantially as described.

2. In a trolley-stand, the combination of a fixed base provided with a ball-bearing groove, an annular flange, and a dished surface with a central aperture inside the flange, a cover provided with a ball-bearing groove, a revoluble base provided with upper and under grooves arranged to register with the grooves in the cover and in the fixed base and with a central stud and moisture-groove concentric therewith, a pole-socket pivotally secured to said stud, substantially as described.

3. In combination with the revoluble base of a trolley-stand, a horizontal pivot-pin secured thereto, a pole-socket having a forked lower end arranged to engage the pivot-pin, tension-springs concentric with the pivot-pin secured at their inner ends to the pole-socket and at their outer ends by washers revoluble on the pin, and nuts arranged to interlock with the washers and to run onto the threaded ends of the pin, substantially as described.

4. In a trolley-stand, the combination of a fixed base provided with a ball-bearing groove, an annular flange, and a central aperture inside the flange, a cover provided with a ball-bearing groove, a revoluble base provided with upper and under grooves arranged to register with the grooves in the cover and in the fixed base and with a central stud and moisture-groove concentric therewith, a pole-socket pivotally secured to said stud, substantially as described.

5. In a trolley-base, the combination of a revoluble base, a fixed base inclosing the revoluble base, a wire lying upon the fixed base and provided with brushes contacting the revoluble base.

6. In a trolley-base, a pole-socket horizontally pivoted to the base, a spring acting to turn the pole-socket until it meets a stop, and a resilient stop adapted to arrest the movement of the pole-socket at such a position that the pole shall not strike against the horizontal stays to the line-wire.

In testimony whereof I sign this specification in the presence of two witnesses.

WILLIAM B. NORTON.

Witnesses:
CHARLES F. BURTON,
MAY E. KOTT.